June 8, 1954 — W. J. MORRILL — 2,680,559
ROTATIVE DRIVING COUPLER
Filed Nov. 2, 1949 — 2 Sheets-Sheet 1

WITNESS
Clyde H. Haynes

INVENTOR.
WAYNE J. MORRILL
BY Woodling and Krost
his attny.

June 8, 1954

W. J. MORRILL 2,680,559

ROTATIVE DRIVING COUPLER

Filed Nov. 2, 1949

WITNESS
Clyde H. Haynes

INVENTOR.
WAYNE J. MORRILL
BY
Woodling and Krost
his attys.

Patented June 8, 1954

2,680,559

UNITED STATES PATENT OFFICE 2,680,559

ROTATIVE DRIVING COUPLER

Wayne J. Morrill, Fort Wayne, Ind.

Application November 2, 1949, Serial No. 125,112

2 Claims. (Cl. 230—259)

My invention relates to a rotative driving coupler in general and in particular to a means for connecting a driving member to a driven member, wherein vibrations in one of the members are isolated from the other member.

A rotative driving member and a driven member should be interconnected by a material which will effect transfer of driving motion and at the same time isolate vibrations to the member in which they occur. This is particularly true in electric fans wherein the fan blades are rotatively driven by the shaft and thus the rotor of an electric motor. Prior to this time, there has been a high-pitched whine or howl which made itself apparent at a number of speeds as electric fans accelerate. These high-pitched whines or howls were noticeable, since they were in the audible range of frequencies.

I have discovered that in an electric motor, the tooth frequency vibrations caused by the passage of the rotor teeth past the stator teeth were responsible for much of this noise in the audible frequency range. According to the theory relating to my discovery, I have found that, when the frequency of a particular motor vibration becomes equal to the resonant frequency of some mode of vibration, such as the fan blades, noise is produced. Since it is understood that the frequency of the particular motor vibration is proportional to the motor speed, an infinite number of noise frequencies are produced by an electric motor having a slotted stator and a slotted rotor. There is no vibration at standstill, or when the motor is not running. As the motor speeds up, the frequency of the noise increases through the audible frequency range. When a motor is running at high or full speed, the resonant frequency caused by the slotted stator and slotted rotor is generally at a frequency higher than the frequencies of the audible range and thus is beyond the audible whine or howl. I have found that many times manufacturing variations and the variations in the load on the fans caused by gusts of wind will cause the fan motor to run at a speed wherein the vibrations and noise produced are in the audible range. Gusts of wind hitting the fan blades will slightly change the speed of rotation of the rotor, thus changing the frequency of the whine or howl resonated from the fan blades.

I have discovered that a principal type of motor vibration which produces the noise is a rotational vibration of the motor. With this in mind, I have designed a driving coupling to effect transfer of driving motion from the driving member or rotor to the driven member or fan blade and also to prevent transfer of vibration from one of the members to the other member. A vibration-isolating material, such for example as rubber, is mounted between the driving member and the driven member, in this instance between the fan blade hub and the rotor. The rubber or other resilient means is put in shear to rotational vibrations and in compression in an axial direction to prevent eccentricity and wobble of the hub.

One of the objects of my invention is to provide a resilient means engaging a rotative driving member and a rotative driven member to effect transfer of driving motion from the driving member to the driven member.

Another object of my invention is to isolate vibrations of the rotor from the hub of the fan blades where the hub is rotated by the rotor.

Another object of my invention is to use the fan blade hub as the end bell of an electric motor and resiliently mount the end bell or the fan hub on the rotor.

Another object of my invention is to provide the rotor with a surface and the end bell with a surface spaced from and facing the surface of the rotor and to resiliently interconnect these surfaces to effect transfer of driving motion from the rotor to the end bell and at the same time isolate within the rotor noise-forming vibrations established therein.

Other objects and a fuller understanding of my invention may be had by referring to the following description and claims, taken in conjunction with the accompanying drawings, in which:

Figure 1 of my drawings is a front elevational view of a window fan having a motor including a rotor and a fan hub wherein the fan hub is the end bell of the motor;

In my drawings I have illustrated the use of my invention in an electric window fan, which is presently being manufactured. However, I do not limit the use of my invention to electric window fans, but understand that it can be used in any rotative device to effect the transfer of driving motion from a driving member to a driven member and isolate vibrations from one member to the other member.

Figures 1, 2:
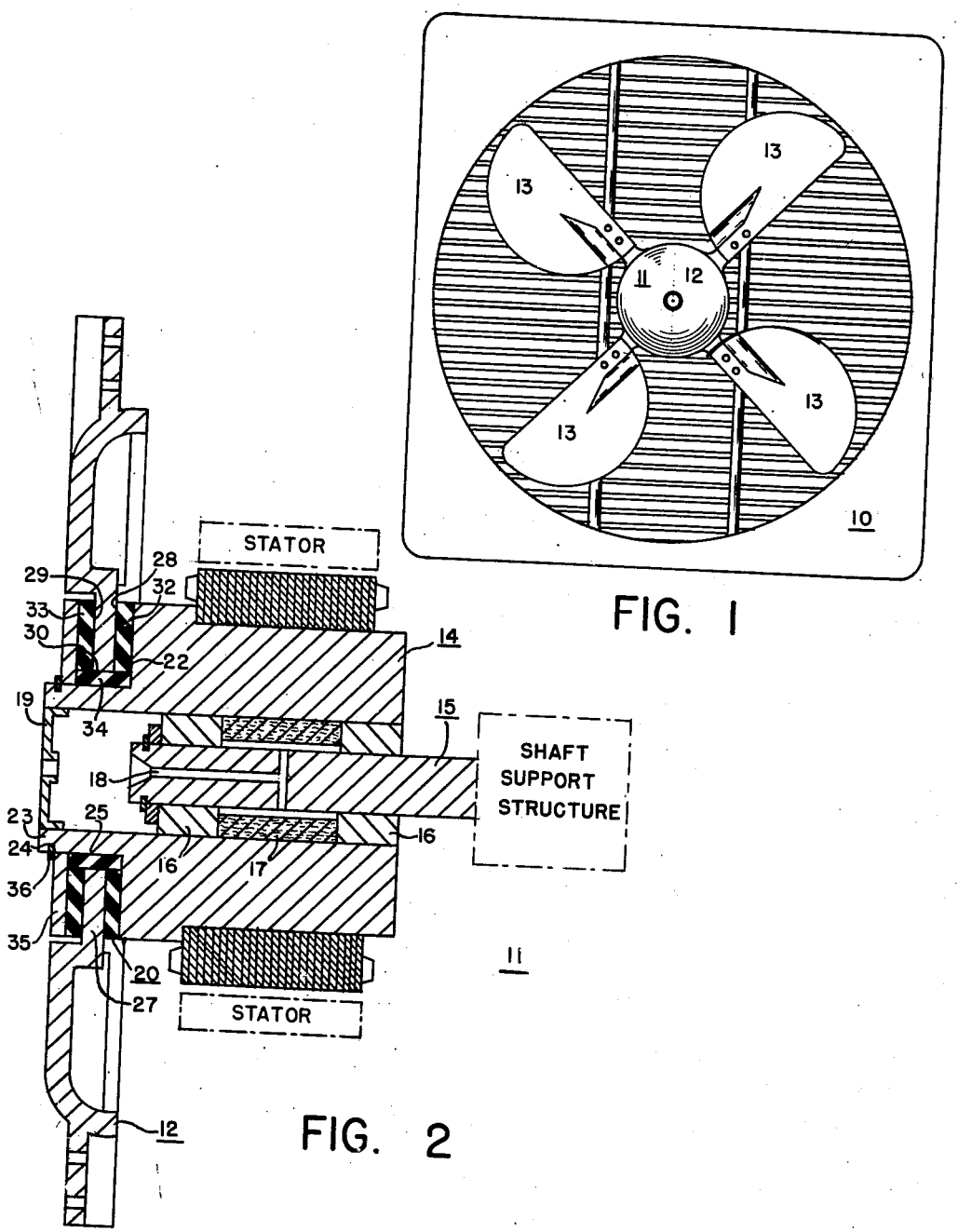
Figure 2 is an enlarged fragmentary cross-sectional view along the line 2—2 of Figure 1, illustrating the resilient mounting of the fan hub on the rotor.

In Figure 1 I illustrate, as one of the practical uses of my invention, a window fan support frame 10 supporting a motor 11 having an end bell constituting a fan blade hub 12, which carries fan blades 13. The motor 11 has a rotor 14 rotatively mounted on a shaft 15. Since this shaft 15 may be supported by suitable supporting methods known in the art of mounting shafts in motors, I have not illustrated the exact method of mounting in my drawings. The rotor 14 is provided with bearings 16 separated by an oil felt pad 17, with the bearings providing an anti-friction mounting of the rotor 14 on the shaft 15. I have also provided the shaft 15 with an oil conduit hole 18 extending from the end of the shaft past one of the bearings 16 and outwardly to the oil felt pad 17. The bearings 16 may thus be oiled through the conduit hole 18, which opens on the end of the shaft 15. An oil cap 19 may be inserted into the rotor 14 to cover the end of the shaft 15 and prevent dirt entering the bearing 16 and the oil felt pad 17. It is understood that other methods of lubrication and bearings may be used without departing from the spirit and scope of my invention.

The resilient and vibration-isolating coupling of the end bell or hub 12 on the rotor 14 is best illustrated in Figure 2 of the drawings. The rotor is a specific form of a driving member and may also be referred to as a rotative member. The hub or end bell is a specific form of a driven member and may also be referred to as a rotated member. The rotative member or rotor 14 and the rotated member or hub 12 are interengaged by a vibration isolating or resilient material 20, which frictionally engages the rotor and the hub and thereby effects transfer of driving motion. The vibration-isolating material 20 may be of any suitable material, such for example as rubber, which may be compressed axially of the rotor and put in shear to rotational vibration to isolate vibrations and thereby prevent transfer of noise-forming vibrations from the rotor 14 to the hub 12 and thus to the resonated fan blades 13.

The rotor 14 has a surface 22 disposed in a plane transversely of the axis of rotation of the rotor. An extension portion 23 extends outwardly from this surface 22 and is provided with an annular groove 24 at the outer end thereof to receive a snap ring. This extension portion 23 is described as having an extension surface 25 extending thereabout and between the surface 22 of the rotor 14 and the annular groove 24.

The end bell 12, which constitutes a fan blade hub for supporting the fan blades 13, has a center support portion 27, which encircles the extension portion surface 25. The surfaces on the opposite sides of the center support portion 27 are designated by the reference characters 28 and 29, with the surface 28 being spaced from and facing the the surface 22 of the rotor 14. An opening in the center support portion 27 defines a cylindrical surface 30, which is spaced from and faces the extension surface 25 of the extension portion 23 of the rotor 14. The vibration-isolating or resilient material 20 frictionally engages the surfaces of the rotor and the surfaces of the end bell or hub and thereby transmits rotational driving movement from the rotor to the hub.

I have found that the most practical way of using this vibration-isolating material 20 is to form the material into washers 32 and 33 and into a sleeve 34. The washer 32 is inserted over the extension portion 23 and against the surface 22 of the rotor. Similarly, the sleeve 34 is slipped over the extension portion 23 and frictionally engages the extension surface 25 of the rotor. The end bell or hub 12 may next be slipped onto the sleeve 34 and against the washer 32 with the surface 28 of the end bell engaging the washer 32 and thus facing the surface 22 of the rotor. The washer 33 may next be pushed about the extension portion 23 and against the surface 29 of the end bell 12. To hold these washers 32 and 33 and the sleeve 34, which operate as a unitary structure to form the vibration-isolating or resilient material 20, in frictional engagement with their respective surfaces, I have used a holding washer 35 and a snap ring 36. The holding washer 35 is forced on to the extension portion 23 and compresses the washer 32 and 33 axially of the rotor. After the holding washer is forced on to the extension portion 23 past the annular groove 24, the snap ring 36 is snapped into the annular groove 24. The snap ring 36 holds the holding washer 35 a predetermined distance from the surface 22 of the rotor, thus maintaining an axial compression on the vibration-isolating or resilient material 20 and thereby preventing wobble and eccentric rotation of the hub. The vibration-isolating or resilient material 20 operates in shear to the rotational vibration and prevents transfer of vibration from one member to the other member, in this instance from the rotor to the hub.

Figure 3:
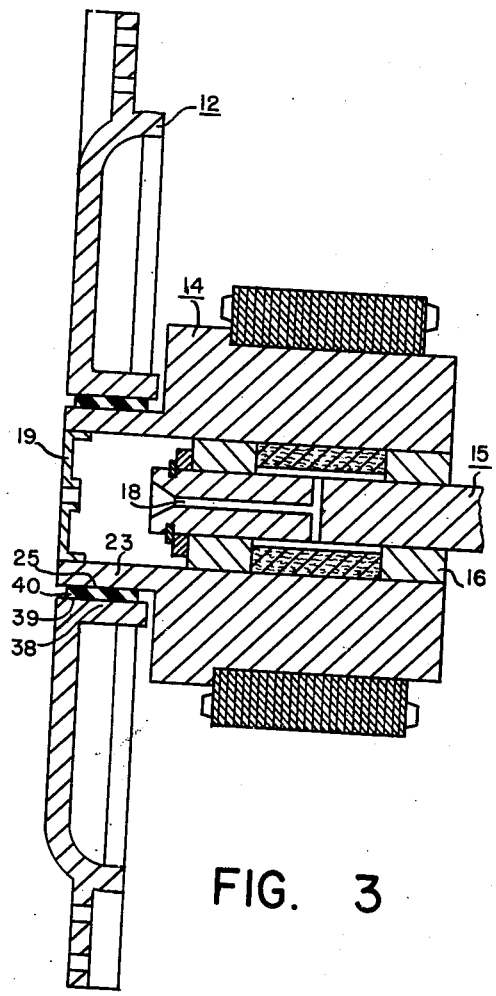
Figure 3 is a fragmentary cross-sectional view of a modification of my invention.

In Figure 3 of my drawings, I illustrate a modification of my invention and my rotative device. In this instance, the hub or end bell 12 is provided with an annular sleeve 38 having an internal surface 39, spaced from and facing the extension surface 25 of the extension portion 23 of the rotor 14. A sleeve 40 of suitable vibration-isolating material frictionally engages the internal surface 39 of the annular groove 38 and the extension surface 25. This resilient sleeve 40 may be bonded to the hub 12 and the rotor 14 or it may be forced between the sleeve 38 of the hub 12 and the extension portion 23 of the rotor 14. The sleeve 40 of resilient material effects the transfer of driving motion from the rotor to the hub or end bell and prevents the transfer of noise-forming vibrations from the rotor to the fan blades.

Figure 4:
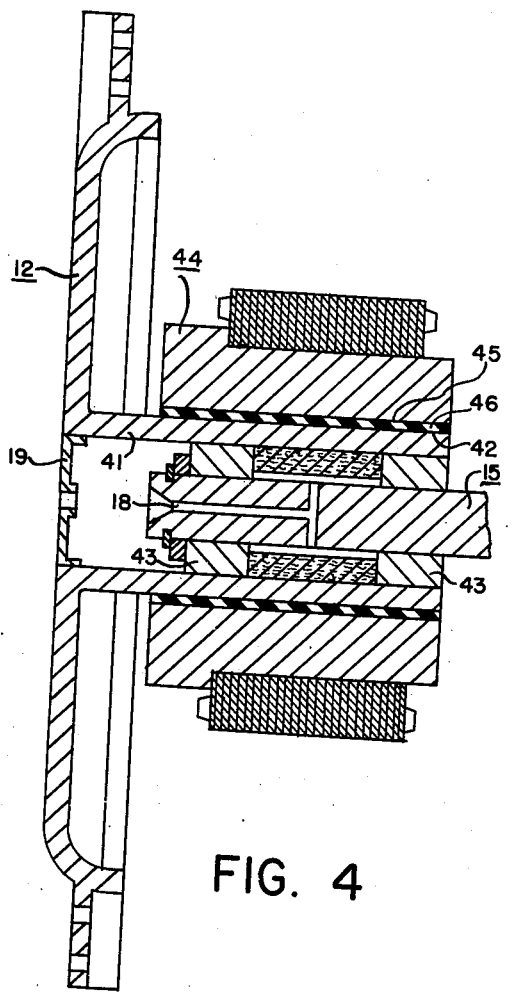
Figure 4 is a fragmentary cross-sectional view of a second modification of my invention.

I have also discovered that the end bell 12 may be provided with a support sleeve 41 extending outwardly from one side thereof, as illustrated in Figure 4 of my drawings. The support sleeve 41 has an outer surface 42 extending thereabout, and has bearings 43 therein for bearingly supporting the end bell 12 of the shaft 15 in much the same manner described in connection with Figure 2 of my drawings. A rotor or driving member 44 having an internal surface 45 is supported about this support sleeve 41. The internal surface 45 of the driving member or rotor 44 is spaced from the outer surface 42 of the support sleeve 41 and faces the surface 42. A sleeve 46 of suitable vibration-isolating or resilient material frictionally engages and separates the surface 45 of the rotor 44 from the surface 42 of the support sleeve 41. This sleeve 46, as in the other embodiments of my invention, transmits driving movement from the rotor to the support sleeve 41 and thus to the fan blades carried thereby.

In all of the embodiments of my invention, I have provided a driving member and a driven member interengaged by a vibration-isolating or resilient material. In each instance, one of these members is supported by the other member with the vibration-isolating or resilient material separating the members from direct contact. The vibration-isolating material transfers rotational driving movement from one member to the other member and at the same time prevents transfer of noise-forming vibrations from one member to the other member. In other words, the vibration-isolating material isolates noise-forming vibrations to the member in which they occur, at the same time permitting one member to drive or rotate the other member.

I have illustrated and described the forcing of the resilient material between a sleeve and hub, and the bonding of the resilient material to the hub. In these mountings frictional engagement of the resilient material and the sleeve or hub is established. It is understood, however, that the hub and the sleeve may be provided with knurled surfaces, small projections or holes and that the resilient material may be molded therein, with the material entering the holes or knurling. Any method of engaging the resilient material with the driven member and driving member may be used providing driving movement is transferred from one member to the other member.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of my invention as hereinafter claimed.

What is claimed is:

1. In an electric fan motor having a stator and a rotor with a substantially axial cylindrical projection extending outboard of said rotor, and an annular planar surface on said rotor substantially normal to the axis of said rotor and surrounding said projection, the provision of a mounting for a fan blade hub having a flat plate with first and second opposed planar surfaces and a cylindrical surface defining a hole, said mounting comprising, a resilient sleeve having an inner surface engaging said cylindrical projection and having an outer surface in engagement with said cylindrical surface of said hole in said fan hub, a first flat resilient washer having substantially planar first and second surfaces with said first surface in frictional engagement with said planar surface on said rotor, said second planar surface on said washer being in frictional engagement with said first planar surface of said fan hub, a lock washer on the outboard end of said cylindrical projection, a second flat resilient washer having substantially planar first and second surfaces with said first surface in frictional engagement with said second planar surface of said fan hub, said second planar surface on said second washer being in frictional engagement with a face of said lock washer, and means engaging only said cylindrical projection and said lock washer to fasten together the aforementioned mounting and to provide an axial compression force on said resilient washers to transmit torque between said rotor and said fan hub.

2. In an electric fan motor having a stator and a rotor with a substantially cylindrical housing enclosing the periphery of same, a substantially axial cylindrical projection extending outboard of said rotor, and an annular planar surface on said rotor substantially normal to the axis of said rotor and surrounding said projection, the provision of a mounting for a combined end bell and fan blade hub having a flat plate with first and second opposed planar surfaces and a cylindrical surface defining a hole, said mounting comprising, a resilient sleeve having an inner surface engaging said cylindrical projection and having an end surface engaging said planar surface on said rotor, an outer surface on said resilient sleeve in engagement with said cylindrical surface of said hole in said fan hub, a first flat resilient washer having substantially planar first and second surfaces with said first surface in frictional engagement with said planar surface on said rotor, said second planar surface on said washer being in frictional engagement with said first planar surface of said fan hub, a lock washer on the outboard end of said cylindrical projection, a second flat resilient washer having substantially planar first and second surfaces with said first surface in frictional engagement with said second planar surface of said fan hub, said second planar surface on said second washer being in frictional engagement with a face of said lock washer, and means engaging only said cylindrical projection and said lock washer to fasten together the aforementioned mounting and to provide an axial compression force on said resilient washers to transmit torque between said rotor and said fan hub.

References Cited in the file of this patent

UNITED STATES PATENTS

| Number | Name | Date |
| --- | --- | --- |
| 1,888,499 | Gunn | Nov. 22, 1932 |
| 2,023,111 | Alsing | Dec. 3, 1935 |
| 2,032,900 | Alger | Mar. 3, 1936 |
| 2,041,555 | Lee | May 19, 1936 |
| 2,164,744 | Huth | July 4, 1939 |
| 2,290,011 | Bahr | July 14, 1942 |